March 9, 1965  W. A. ANDERSON  3,173,084
GYROMAGNETIC RESONANCE METHOD AND APPARATUS
Filed April 30, 1962  3 Sheets-Sheet 1
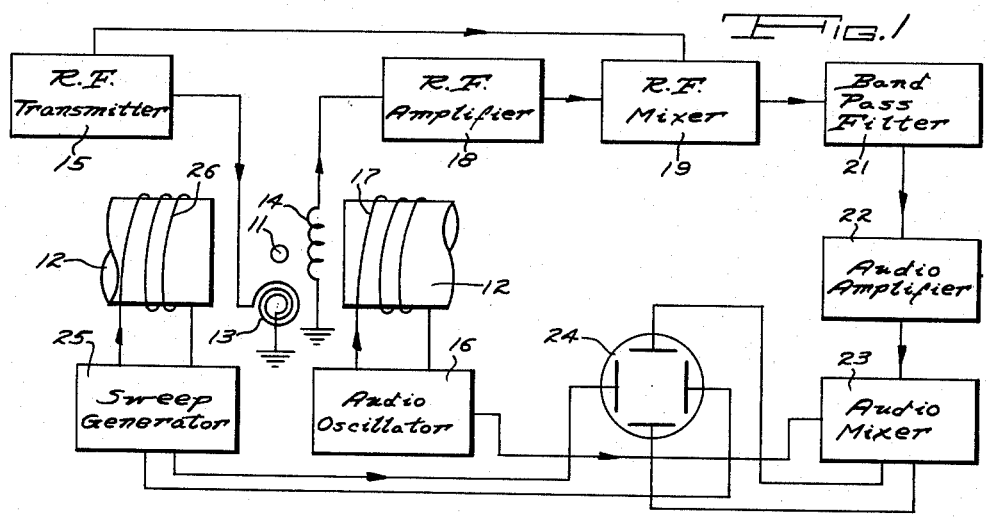
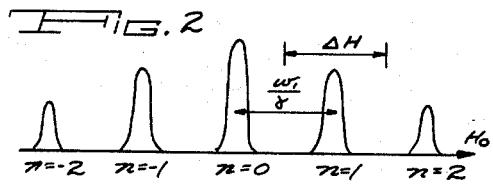
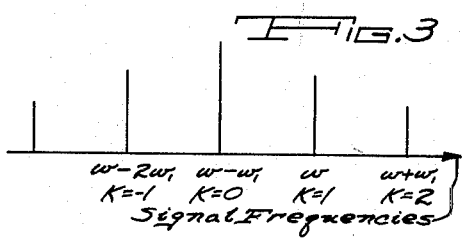
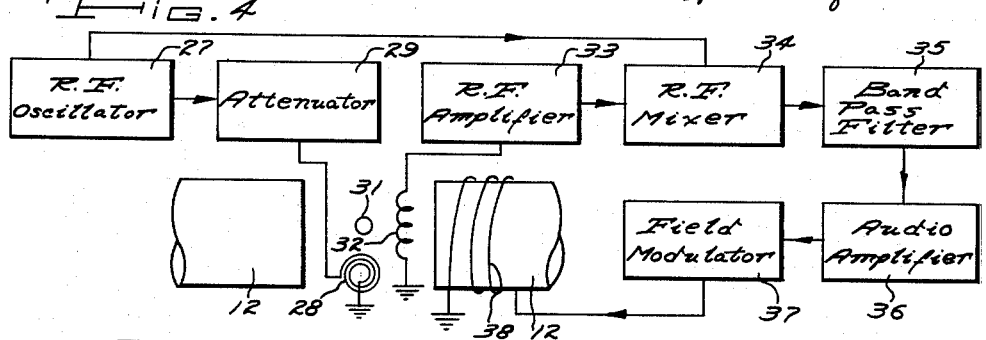
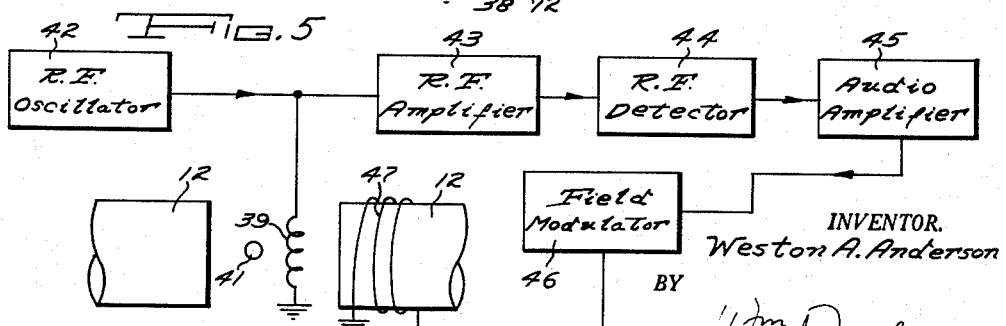
INVENTOR.
Weston A. Anderson
BY
Wm J. Nolan
Attorney March 9, 1965  W. A. ANDERSON  3,173,084
GYROMAGNETIC RESONANCE METHOD AND APPARATUS
Filed April 30, 1962  3 Sheets-Sheet 2
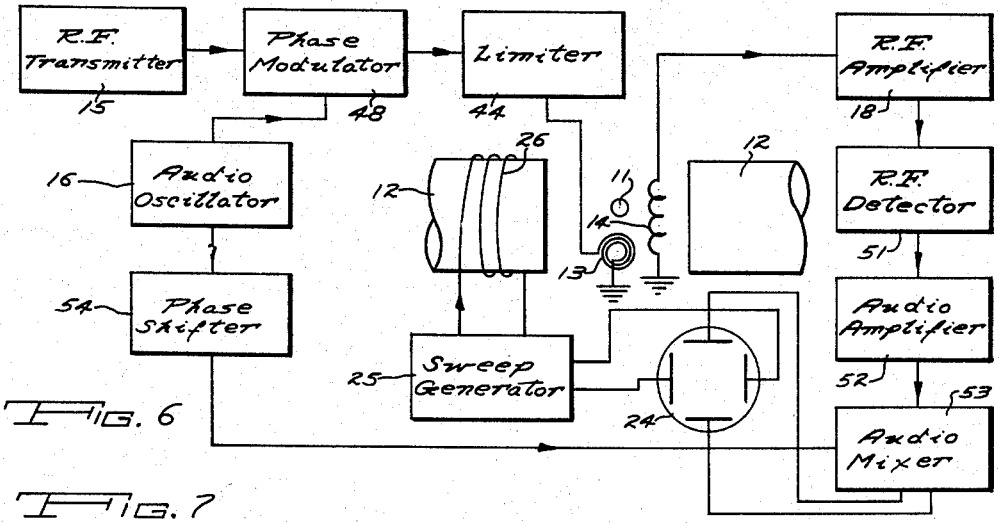
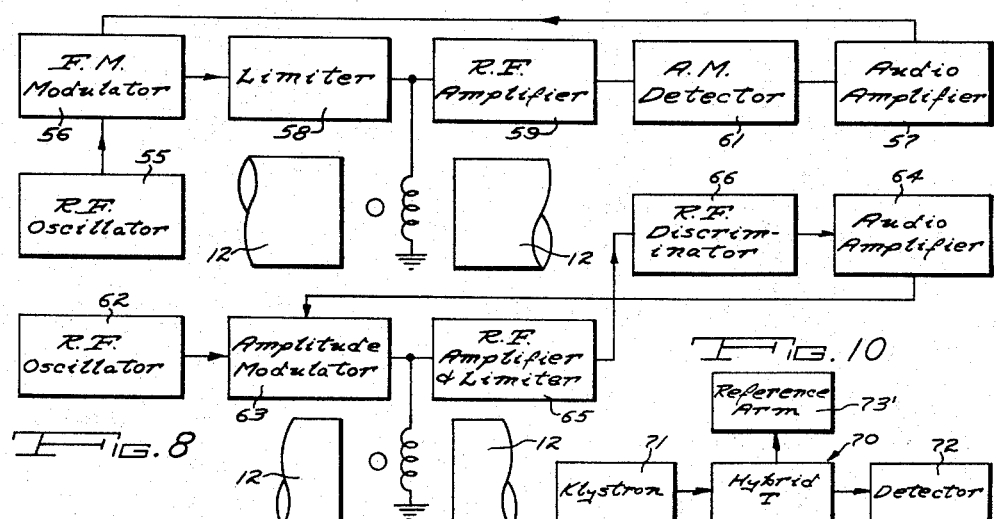
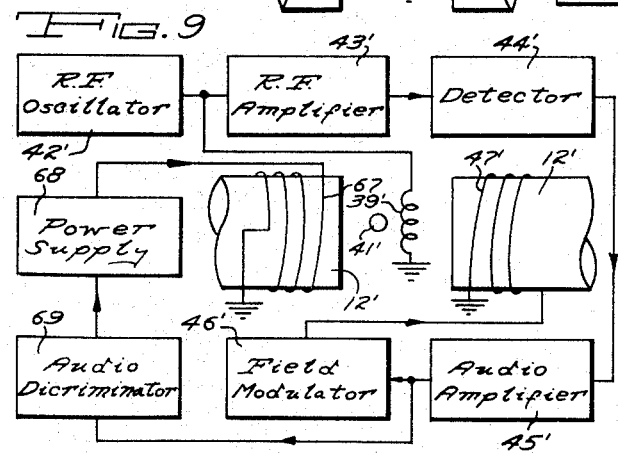
INVENTOR.
Weston A. Anderson
BY
Attorney

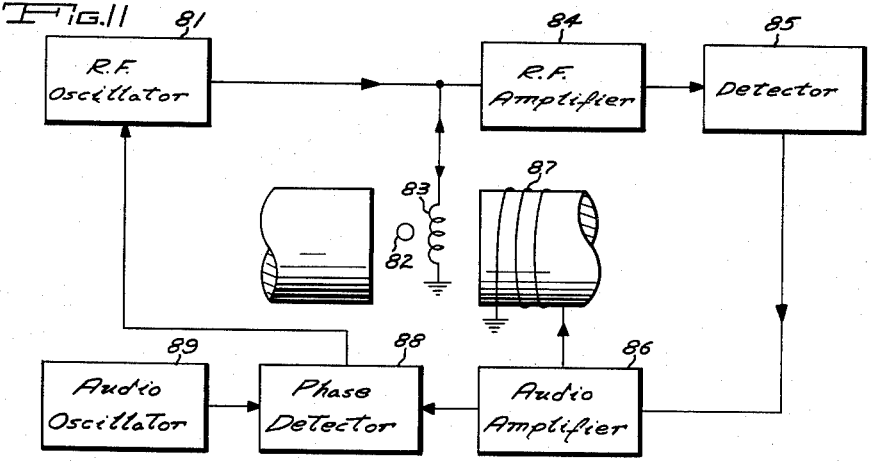
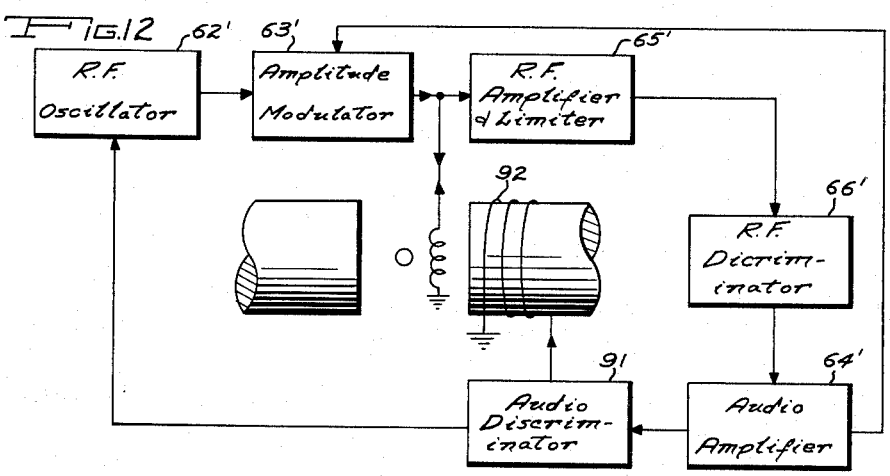
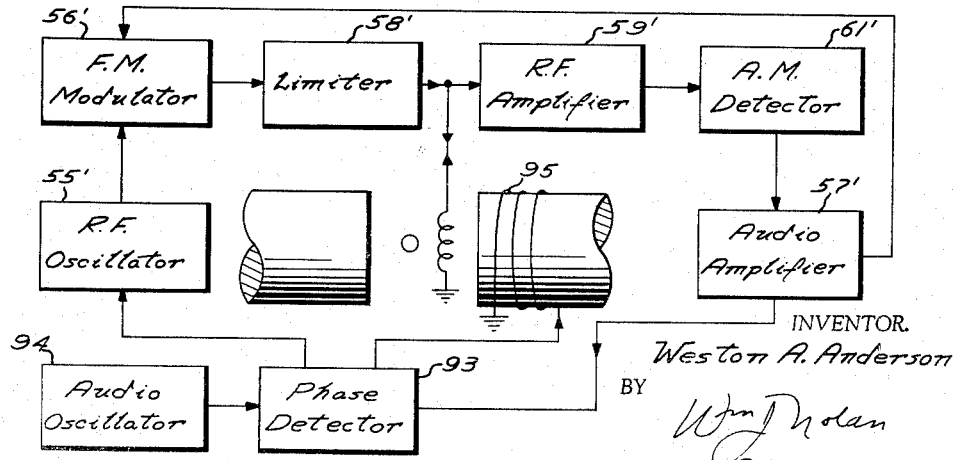

United States Patent Office 3,173,084
Patented Mar. 9, 1965

3,173,084
GYROMAGNETIC RESONANCE METHOD AND APPARATUS
Weston A. Anderson, Palo Alto, Calif., assignor to Varian Associates, Palo Alto, Calif., a corporation of California
Filed Apr. 30, 1962, Ser. No. 191,356
32 Claims. (Cl. 324—.5)

This application is a continuation-in-part of U.S. patent application Serial No. 57,793, filed September 22, 1960, now abandoned, which in turn was a continuation-in-part of U.S. patent application Serial No. 767,654, filed October 16, 1958, now issued as U.S. Patent 3,147,428 on September 1, 1964.

This invention relates in general to gyromagnetic resonance apparatus and more particularly to novel improved apparatus and methods utilizing side band resonance techniques for producing a gyromagnetic resonance oscillator.

The present invention involves utilization of modulation techniques in a gyromagnetic resonance system in which the parameters of the system are so arranged that side band resonances are produced and, by suitable receiver and feedback circuitry, self-sustaining side band resonance oscillations are produced. The present invention encompasses the use of polarizing magnetic field modulating systems for producing the desired side band resonances and, in addition, an embodiment in which the driving radio-frequency signal utilized to produce the gyromagnetic resonance is frequency modulated and utilized with an amplitude modulation receiving end. In another embodiment, the radio-frequency transmitted signal is amplitude modulated by suitable means while the receiver section of the system utilizes frequency modulation for detection of the side band resonance signal.

It is, therefore, the object of the present invention to provide novel improved gyromagnetic resonance oscillator systems utilizing side band resonance techniques.

One feature of the present invention is the provision of a novel side band resonance gyromagnetic resonance oscillator system in which the side band resonance is produced in the gyromagnetic substance by modulation of the unidirectional polarizing magnetic field, the receiver and feedback section of the system being responsive to the side band resonance signal obtained from the substance and producing the modulating signal utilized to modulate the polarizing magnetic field.

Another feature of the present invention is the provision of a novel gyromagnetic resonance oscillator system wherein the side band resonance is produced in the gyromagnetic resonance substance or sample by a frequency modulation of the driving radio frequency transmitter signal, the receiver and feedback section being sensitive to amplitude modulation of the resonance signal and producing the modulating signal utilized to modulate the transmitter signal.

Still another feature of the present invention is the provision of a side band resonance gyromagnetic resonance oscillator system wherein the driving radio frequency transmitter signal is amplitude modulated to produce side band resonance from the gyromagnetic substance, the receiver and feedback section of the system being made sensitive to frequency modulation and producing the modulating signal utilized to amplitude modulate the transmitter signal.

Still another feature of the present invention is the incorporation into any of the above-featured side band oscillators of a novel method and means for controlling the strength of the polarizing magnetic field or transmitter frequency in response to the side band resonance oscillator signal.

These and other features and advantages of the present invention will become more apparent after a perusal of the following specification taken in connection with the accompanying drawings wherein:

FIG. 1 is a block diagram showing a side band resonance gyromagnetic resonance system in which audio or low frequency modulation of the magnetic field is utilized to produce the side band resonance, the system being a crossed-coils type of resonance system, FIG. 2 is a graphical illustration of the resonance signals obtained from a system of the type shown in FIG. 1, FIG. 3 is a graphical illustration showing the frequency components of one of the side band resonance signals of the type shown in FIG. 2, FIG. 4 is a block diagram of a side band resonance gyromagnetic resonance oscillator system in which audio or low frequency modulation of the mangetic field in utilized to produce the side band resonance, the system being a crossed-coils type of resonance system, FIG. 5 is a system similar to that shown in FIG. 4 also utilizing audio or low frequency modulation of the magnetic field, this system being a single coil rather than a crossed-coils arrangement, FIG. 6 is a block diagram of a side band resonance gyromagnetic resonance system in which audio or low frequency modulation of the transmitter frequency is utilized to produce side band resonance signals from the substance, FIG. 7 is a block diagram of a side band type gyromagnetic resonance oscillator in which the transmitter section is frequency modulated to produce side band resonance and the receiver and feedback section is sensitive to amplitude modulation, FIG. 8 is a block diagram of a side band resonance oscillator system in which the transmitter section of the system is amplitude modulated to produce the side band resonance condition while the receiver and feedback section is sensitive to frequency modulation, FIG. 9 is a block diagram of a side band resonance gyromagnetic resonance oscillator system incorporating a field control feature, FIG. 10 is a block diagram of a higher frequency side band oscillator employing electron paramagnetic resonance, FIG. 11 is a diagram of a side band resonance oscillator system wherein the polarizing magnetic field is modulated to produce the side band resonance condition and incorporating an automatic control of the frequency of the radio frequency magnetic field, FIG. 12 is a diagram of a side band resonance oscillator system wherein amplitude modulation of the radio frequency field is utilized to produce the side band resonance condition and incorporating an automatic control of the frequency of the radio frequency field and the strength of the polarizing magnetic field, and FIG. 13 is a diagram of a side band resonance oscillator system wherein frequency modulation of the radio frequency field is utilized to produce the side band resonance condition and incorporating an automatic control of the frequency of the radio frequency field and the strength of the polarizing magnetic field.

Referring now to FIG. 1, there is shown in block diagram form a crossed-coils gyromagnetic resonance spectroscopy system which will be utilized to explain the theory of side band resonance before describing the side band resonance oscillators embodying the present invention. The substance or sample 11 in which gyromagnetic resonance is to occur, for example, resonance of the nuclear magnetic moments of the substance, is placed in the strong unidirectional magnetic field $H_0$ in the gap of a permanent magnet or electromagnet 12. A transmitter coil 13 and a receiver coil 14 are located in close coupling relationship to the sample 11, the coils being mutually perpendicular and also perpendicular to the unidirectional magnetic field $H_0$. A radio-frequency transmitter or oscillator 15 is coupled to the transmitter coil 13 and supplies a radio-frequency driving field $H_1$ to the sample 11 at an angular frequency $\omega$ to produce the desired nuclear magnetic resonance in the sample in a manner well-known in the art, side band resonance being produced in a manner described below.

Due to the close physical proximity of the receiver coil 14 and the transmitter coil 13, there is a small electromagnetic coupling therebetween despite the fact that these two coils are positioned normal to each other, and because of this slight coupling the receiver coil has induced therein a small leakage signal from the transmitter coil at the transmitter frequency $\omega$. At or near resonance of the nuclear magnetic moments in the sample the receiver coil also has induced therein a signal due to the resonance condition of the nuclei at the frequency $\omega$.

The unidirectional magnetic field $H_0$ is modulated by an audio or low frequency (for example, 1 kc. to 100 kc.) magnetic field $H_m$ from the audio oscillator 16 and associated modulation coil 17 at an audio-frequency $\omega_1$, the amplitude of the unidirectional magnetic field thus being modulated at the audio-frequency rate to give a total field $H_Z = H_0 + H_m \cos(\omega_1 t + \phi)$.

To determine the effects of field modulation, consider a special solution of the phenomenological equations in the Physical Review Article, vol. 70, pages 460–74, 1946, by Felix Bloch. If we let $m = M_x + iM_y$, $h = \gamma(H_x + iH_y)$ and $\omega_A = \gamma H_Z$ the equations may be written in the following form:

(1) $$\frac{dm}{dt} + i\omega_A m - ihm_z + \frac{m}{T_2} = 0$$

(2) $$\frac{dM_z}{dt} + I_m(mh^*) + \frac{M_z}{T_1} = \frac{M_0}{T_1}$$

where $I_m$ denotes the imaginary component and $*$ denotes the complex conjugate.

The oscillation radio-frequency field along the x-axis may be decomposed into two counter-rotating fields. Since only the rotating field which rotates in the same direction as the Larmor precession is effective in stimulating transitions, see the Bloch-Siegert paper, Physical Review vol. 57, 1940, page 522, only this component need to be used in the analysis. If the applied R.F. field is sufficiently small, one may replace $M_z$ by $M_0$ and neglect Equation 2. With $m = m_1 e^{-i\omega t}$ and $h = h_1 e^{-i\omega t}$, Equation 1 becomes (3) $$\frac{dm_1}{dt} + i(\omega_A - \omega)m_1 + \frac{m_1}{T_2} = iW_1 M_0$$

Without loss of generality we let the phase angle $\phi = 0$; the field modulation then has the form $$H_Z = H_0 + H_m \cos \omega_1 t$$

which is equivalent to $\omega_A = \omega_0 + \gamma H_m \cos \omega_1 t$ where $\omega_0 = \gamma H_0$, and let $\Delta\omega = \omega_0 - \omega$. With the above substitutions the differential Equation 3 has the solution $$m_1 = ih_1 M_0 \int_{-\infty}^{t} \exp \int_{t}^{t'} \left\{ \left(\frac{1}{T_2} + i\Delta\omega + i\gamma H_m \cos \omega_1 t''\right) \right\} dt'' dt'$$

If the variation of $\Delta\omega$ is sufficiently slow, one obtains (4) $$m_1 = ih_1 M_0 \int_{-\infty}^{t} \left[ \exp \left\{ \left(\frac{1}{T_2} - i\Delta\omega\right)(t' - t) + i\beta \sin \omega_1 t' - i\beta \sin \omega_1 t \right\} \right] dt$$

with $$\beta = \frac{\gamma H_m}{\omega_1}$$

This equation may be integrated with the help of the identity $$\exp\{i\beta \sin \omega_1 t\} = \sum_{n=-\infty}^{\infty} J_n(\beta) \exp(in\omega_1 t)$$

where $J_n(\beta)$ are Bessel functions of the first kind. Upon integrating, one obtains (5) $$m_1 = ih_1 T_2 M_0 \sum_{k=-\infty}^{\infty} \sum_{n=-\infty}^{\infty} \frac{J_k(\beta) J_n(\beta) \exp\{-i(k-n)\omega_1 t\}}{1 + i(\Delta\omega + n\omega_1)T_2}$$

The quantity $m_1$ is just the magnetization in the rotating coordinate system and thus it is a measure of the signal $u + iv$ which one obtains after mixing the signal voltage with the R.F. reference voltage. This analysis shows that the resonance condition is not only fulfilled by the equation $\omega = \gamma H_0$ but also a series of additional side band resonances are obtained, each resonance separated from the adjacent resonance by $$\frac{\omega_1}{\gamma}$$

in magnetic field units. This separated resonance condition is met when $\omega_1$ is greater than $$\frac{1}{T_2}$$

These resonances are indicated diagrammatically in FIG. 2. Here each separate resonance corresponds to a different value of $n$ in Equation 5. If we now select, for illustration purposes, a given resonance signal, $n$, and Fourier analyze the frequencies present in the signal, we find all frequencies of the form $\omega + (k-n)\omega_1$, to be present where $k$ is a positive or negative integer or zero. This is shown diagrammatically in FIG. 3 where the frequencies present for the $n=1$ side band are represented. The parameters of the system are selected such that the region represented by $\Delta H$ is slowly swept through to produce this $n=1$ side band resonance.

Thus, the total signal induced in the receiver coil includes a leakage signal directly from the transmitter coil 13 at the transmitter frequency $\omega$, and a nuclear resonance signal from the nuclear magnetic moments with a frequency component $\omega$ as well as components at all frequencies which differ from $\omega$ by an amount $\omega_1$, $2\omega_1$, $3\omega_1$ . . . . These leakage and resonance signals are amplified by a radio-frequency amplifier 18 and fed to a radio-frequency mixer or R.F. detector circuit 19 which obtains a reference signal at the frequency $\omega$ directly from the R.F. transmitter 15. In accordance with well known operation of such mixing or detecting circuits, the superimposition of a signal wave and a reference wave of different frequencies results in an output wave which pulsates in amplitude at the difference frequency of the component waves. In the present instance, one of the signal components from the R.F. amplifier 18, that is, the leakage signal, is of the exact same frequency as the reference signal from the radio-frequency transmitter 15 and thus the output component from the mixer corresponding to these two waves is a D.C. signal. In addition, the component of the nuclear resonance signal obtained from the R.F. amplifier 18 which is of the same frequency $\omega$ as the R.F. transmitter frequency reference signal also results in a D.C. signal output from the mixer. However, the output of the mixer 19 contains signal components with frequencies $\omega_1$, $2\omega_1$, $3\omega_1$ . . . due to the side band nuclear resonance signals resulting from the audio modulation applied to the magnetic field $H_0$. The output of the R.F. mixer 19 is coupled to a bandpass filter 21 which is designed to pass only frequencies near $\omega_1$ and to reject all D.C. signals and signals near $2\omega_1$, $3\omega_1$, etc. It is noted that all of the leakage signals occurring between the transmitter coil 13 and receiver coil 14 has been converted to a D.C. signal in the mixer 19, filtered by the band-pass filter 21, and ths effectively removed from the system at this point.

In this case (for $n=1$ and $k=0$) the audio signal is given by $$u+iv=\frac{ih_1T_2m_0J_1(\beta)J_0(\beta)[\cos\omega_1 t-i\sin\omega_1 t]}{1+i(\Delta\omega+\omega_1)T_2}$$

Thus the audio component contains both $u$ and $v$ modes which may be selected independently by proper choice of the phase of the audio reference voltage.

The $\omega_1$ output of the band-pass filter 21 is fed to an audio amplifier 22 for amplification and then to an audio mixer circuit 23 which obtains its reference frequency $\omega_1$ directly from the audio oscillator 16 utilized to modulate the magnetic field $H_0$. The output of this mixer 23 contains a D.C. leakage free signal which is suitable for observation on an oscilloscope 24 or for recording on a graphic recorder or the like. The unidirectional magnetic field $H_0$ may be slowly swept through resonance as in a manner utilized in previous nuclear resonance spectrometers by a well-known sawtooth sweep.

Referring now to FIG. 4, there is shown a side band resonance oscillator utilizing the side band resonance technique explained above. An R.F. oscillator or transmitter 27 supplies a driving radio frequency field $H_1$ at a frequency $\omega$ to the transmitter coil 28 (through an attenuator circuit 29, which may be employed if desired) to produce nuclear magnetic resonance in the gyromagnetic substance or sample 31. The receiver coil 32 is coupled to a receiver and feedback circuit including the R.F. amplifier 33, R.F. mixer or detector 34, band-pass filter 35, audio amplifier 36, field modulator or compensation circuit 37, and unidirectional magnetic field modulation coil 38. The similarity between the spectrometer circuitry in FIG. 1 and the side band oscillator of FIG. 4 is apparent with the exception that the output signal at frequency $\omega_1$ from the audio amplifier is coupled or fed back to the modulation coil 38 to supply the audio or low frequency modulation signal to the magnetic field $H_0$ for side band operation, whereas in the spectrometer of FIG. 1 modulation was supplied by the separate audio oscillator 16. The circuit of FIG. 4 functions as a self-excited side band resonance oscillator in which the frequency of the audio feedback signal varies with and is thus locked to the strength of the unidirectional magnetic field $H_0$ and the frequency $\omega$ in accordance with the general relationship $\omega_1=|\gamma H_0-\omega|$. Oscillations at $\omega_1$ are initiated in the same manner as in feedback oscillators in general, i.e., noise energy at the proper frequency initiates the oscillations which are fed back and built up until equilibrium is established. The range of field-frequency over which this system will operate is determined in part by the audio bandwidth of the audio amplifier 36 and sweep coil 38. Although the output of the amplifier 36 may be coupled directly to the coil 38 without need of any compensation, a field modulation or compensation circuit 37 may be employed, if desired, to hold the amplitude of the side band resonance signal substantially constant over the audio band by compensating the amplitude of the current being fed to the sweep coil 38 as a function of the audio frequency or, in other words, to compensate for the lowering of the modulation index as the audio frequency increases. To obtain the desired increase in signal amplitude as the audio frequency increases and vice versa, the compensation network may consist of a series capacitor in the line between the amplifier 36 and the field modulation coil 38, the impedance of which decreases with frequency increase (see, for example, condenser 86' in FIG. 11). In order to prevent saturation of the sample and insure stability of the system, it may be desirable to include a limiter circuit in the field modulator or compensation circuit 37. For proper phase of the feedback signal, a phase shifter circuit may be included in the feedback circuit if necessary, for example, in the field modulator circuitry. One form of compensation circuitry is disclosed and claimed in United States patent application, Serial No. 131,414, filed August 14, 1961 by David E. Gielow and David L. Wright, and now Patent No. 3,127,556 granted March 31, 1964.

If the crossed coils are not perfectly balanced and there is a transmitter frequency leakage into the receiver circuitry, a radio frequency detector circuit which employs the leakage signal as the reference signal may be employed in place of the radio frequency mixer 34. Also, the band pass filter 35 may not be necessary if the index of modulation is chosen to favor the signal component which has the frequency $\omega\pm\omega_1$ and it is not shown in later figures.

Referring to FIG. 5, there is shown a side band resonance oscillator similar to that of FIG. 4 except that the system employs only a single coil 39 coupled to the gyromagnetic substance or sample 41. The driving radio frequency signal is supplied by the oscillator 42. The side band resonance signal from the sample and the leakage signal from the oscillator 42 will be amplified in amplifier 43 and mixed in the detector 44 to produce the audio frequency $\omega_1$ which is amplified by audio amplifier 45 and transmitted through the field modulator or compensation circuit 46 to the field sweep coil 47. It should be understood that a single coil bridge type circuit or other forms of circuits may be utilized as desired. For example, an oscillating detector circuit may be employed for supplying the radio frequency field $H_1$ to the substance, the audio frequency output from the oscillating detector being fed back to produce the field modulation necessary to sustain side band resonance oscillations.

In one nuclear side band oscillator constructed as in FIG. 5, a transmitter 42 of approximately 60 megacycles was utilized with a sample of water in a field strength $H_0$ of about 14,100 gauss. The audio amplifier had a bandwidth of about 50 kc. The field $H_0$-frequency $\omega$ relationship was set to give a nominal value of modulation frequency $\omega_1$ of about 5 kc.

There are other embodiments of this side band resonance technique which may be used in place of the above-described magnetic field modulated systems. In one such system, the transmitter signal is frequency modulated while the receiver and feedback section of the system utilizes amplitude modulation detection (FM-AM system). In another such system, the transmitter signal is amplitude modulated while the receiver and feedback section of the system utilizes frequency modulation detection of the resonance signal (AM-FM system).

To obtain the results for AM-FM and FM-AM systems, one may consider separately the R.F. fields seen by the nuclei. For each different Fourier component we may assume that the usual slow passage solution of the phenomenological equations is valid and then add the individual solutions below. This method is perfectly valid so long as the separate side band spacings are large compared to the natural line widths.

In FIG. 6 there is shown a block diagram of a gyromagnetic resonance spectrometer system which will be used to explain the transmitter signal modulation technique utilized in the subsequently described side band oscillators of the present invention. In this system the radio-frequency driving signal $\omega$ is frequency modulated at the audio or low frequency rate and the system employs crossed coils similar to FIG. 1, although this frequency modulation scheme is equally applicable to bridge systems and other single coil systems. The radio-frequency transmitter 15 generates a signal of frequency $\omega$ which is coupled to a phase modulator circuit 48 which is also coupled to the audio oscillator 16 from which it receives a modulating signal of frequency $\omega_1$, the R.F. oscillator signal thus being frequency modulated at the audio-frequency rate to give an output signal with components including $\omega$, $\omega+\omega_1$, and $\omega-\omega_1$. These signals pass into an R.F. limiter circuit 44 which serves to limit any undesired amplitude variations occurring in the transmitter 15 or modulator 48, since the receiver end of this system is sensitive to amplitude variations. Provided the transmitter 15 is stable so that amplitude fluctuations do not occur and the modulator does not introduce any AM components, the limiter 44 may be omitted. The audio-frequency should be large compared to the line spacings in a spectra and small compared to the band-pass of the R.F. amplifier and limiter in this system. For example, an audio-frequency of two kilocycles may be selected as illustrative.

By phase modulating the transmitter signal, the R.F. field of the transmitter coil expressed in complex form is $$h_1 \exp(i\omega t + i\beta \sin \omega_1 t) = h_1 \exp(i\omega t) \sum_{M=-\infty}^{M=-\infty} J_n(\beta) \exp(in\omega_1 t)$$

where $\beta$ is the maximum change of phase angle produced by the modulator 48.

This system does not have the same restraint on the audio-frequency value as does the system of FIG. 1, wherein the magnetic field $H_0$ is audio modulated. As the audio-frequency $\omega_1$ used in the system of FIG. 1 increases, higher $H_m$ power is necessary since $$\beta = \gamma \frac{H_m}{\omega_1}$$

and this power demand limits the audio frequency to lower values than can be readily utilized in this frequency modulation system.

The values of the frequencies $\omega$ and $\omega_1$ and the strength of the field $H_0$ are so chosen that the nuclear resonance is made to occur in the sample at one of the sidebands, for example $n=1$.

In this case the magnetic field $H_0$ must be equal to $$\frac{\omega + \omega_1}{\gamma}$$

to produce resonance. The resonance signal in this case has only the frequency $\omega + \omega_1$. The R.F. field at this frequency has an amplitude of $h_1 J_1(\beta)$ and so the saturation parameter will be $s = \gamma^2 H_1^2 J_1^2(\beta) T_1 T_2$. The input to the R.F. amplifier 18 thus comprises the output signal directly from the transmitter coil 14, including the frequency components $\omega$, $\omega + \omega_1$, and $\omega - \omega_1$, and, at resonance, the signal $\omega + \omega_1$. The output of the R.F. amplifier 18 is fed to an R.F. detector 51. During the time no resonance signals are stimulated, there will be no output from the R.F. detector 51 since the detector is only sensitive to the amplitude changes of the R.F. voltage. However, in the presence of a resonance signal, an audio output at the frequency $\omega_1$ will occur at the output of the R.F. detector 51 since the incoming wave will now have some amplitude modulation. The audio signal is amplified in audio amplifier 52 and is converted into a D.C. signal in the audio mixer 53. Either the $u$ or $v$ mode component may be selected by the choice of the phase, by means of phase shifter 54, of the audio reference voltage from the audio oscillator 16.

FIG. 7 discloses a side band resonance oscillator in which the front or transmission section utilizes frequency modulation while the receiver and feedback section is made sensitive to amplitude modulated signals. The reverse is shown in the oscillator system of FIG. 8 where the front section is an amplitude modulation system and the receiver and feedback section is made sensitive to frequency modulation.

In the signal coil side band resonance oscillator system shown in FIG. 7, the radio-frequency oscillator 55 supplies a signal to the frequency modulator 56 which receives its reference signal in a feedback circuit from the audio amplifier 57. The output of the modulator 56 is coupled through a limiter 58 to the sample in the magnetic field, the parameters of the radio-frequency and magnetic field being chosen so that resonance occurs in the sample at one of the side band frequencies. The resonance signal is transmitted through the radio frequency amplifier 59 to the amplitude modulation detector 61, the output of which is coupled to the audio amplifier 57 and through the feedback circuit to the frequency modulator 56.

Referring to FIG. 8, there is shown in block diagram a side band resonance oscillator system incorporating this invention in which the transmitter signals are amplitude modulated, as distinguished from the frequency modulation utilized in the system of FIG. 7, and the receiver and feedback circuitry of the system is made sensitive to frequency modulated signals, as distinguished from the amplitude modulation sensitivity of the receiver circuitry in the system of FIG. 7. This system may be referred to as the AM-FM system and, although embodied in a single coil system, as noted before, it can be utilized as well in a crossed-coils system.

The radio-frequency signal $\omega$ from the R.F. transmitter 62 is applied to an amplitude modulator 63 which receives the audio modulating signal at frequency $\omega_1$ from the audio amplifier 64. The signal output from the amplitude modulator 63 to the R.F. coil contains $\omega$, $\omega + \omega_1$ and $\omega - \omega_1$. The system parameters are selected such that resonance occurs in the sample at one of the side band frequencies, for example, $\omega + \omega_1$. The signal into the probe is $(1 - M \sin \omega_1 t) \sin \omega t$ where $M$ = index of modulation.

The signal into the R.F. amplifier and limiter 64 during upper side band resonance is then given by $$\sin \omega t + (1 + \epsilon v)\frac{M}{2} \cos(\omega + \omega_1)t + \epsilon u \frac{M}{2} \sin(\omega + \omega_1)t + \frac{M}{2}\cos(\omega - \omega_1)t = \alpha(t)\sin[\omega t + \theta(t)]$$

where $$\alpha^2 = \left[1 + M\left(1 - \frac{\epsilon v}{2}\right)\sin \omega_1 t + \frac{M}{2}\epsilon u \cos \omega_1 t\right]^2 + \left[\frac{M}{2}(\epsilon v \cos \omega_1 t + \epsilon u \sin \omega_1 t)\right]^2$$

and $$\tan \theta = \frac{\frac{M}{2}(\epsilon v \cos \omega_1 t + \epsilon u \sin \omega_1 t)}{1 + M \sin \omega_1 t - \frac{M}{2}(\epsilon v \sin \omega_1 t - \epsilon u \cos \omega_1 t)}$$

and $\epsilon u$ is the $u$ signal and $\epsilon v$ is the $v$ signal.

Under normal conditions $\epsilon u \epsilon v \ll 1$ thus $\theta \ll 1$, we expand $$\theta = \frac{M}{2}\frac{(\epsilon v \cos \omega_1 t + \epsilon u \sin \omega_1 t)}{1 + M \sin \omega_1 t}$$

In passing the R.F. signal through the limiter we fix $\alpha$ and leave $\theta$ unchanged.

We now Fourier analyze $\theta$. For $M \ll 1$ this is simply $$\theta = \frac{M}{2}\epsilon u \sin \omega_1 t + \frac{M}{2}\epsilon u \cos \omega_1 t$$

Expressed in another way, if there is no resonance taking place in the sample, the output of the radio-frequency amplifier and limiter 65 contains only $\omega$ because the limiter removes all amplitude modulation from the $\omega$ signal. If resonance is occurring, however, the signal into the limiter contains both amplitude and frequency modulation of the carrier $\omega$. The limiter removes the amplitude modulation and passes the frequency modulation and, thus, the output of the limiter is a frequency modulated carrier whose phase varies in accordance with the resonance signal. The output from the R.F. amplifier and limiter 65 is passed to an R.F. discriminator 66, the output of which is an audio signal at frequency $\omega_1$ which varies in amplitude with resonance. This output is transmitted through the audio amplifier 64 back to the amplitude modulator 63 to thereby provide a closed loop feedback circuit for sustaining oscillation of the system. As in other systems of the AM-FM type, this system gives both radio-frequency and audio-frequency gain with the advantage of not requiring large amplification at high frequencies. In addition, this system is not sensitive to changes in radio-frequency gain.

In all of the above side band resonance oscillator systems, the main advantage is that the instantaneous audio-frequency corresponds directly to the instantaneous value of the magnetic field $H_0$ (other parameters being assumed constant) within the bandwidth of the audio amplifiers and sweep coils. Thus, this audio frequency signal may be used to compensate for rapid variations as well as slow variations in the magnetic field $H_0$. As noted above, the audio frequency is also dependent on the frequency $\omega$ and thus also compensates for changes therein. These systems are insensitive to changes in transmitter-receiver coil balance.

Referring to FIG. 9, there is shown a side band resonance system similar to that shown in FIG. 5 incorporating magnetic field control. Circuits in this system similar to that in FIG. 5 bear the same reference numerals primed. The polarizing magnetic field $H_0$ is supplied by an electromagnet 12' with energizing windings 67 supplied with current from the magnet power supply 68. The audio frequency signal output from the audio amplifier 45' is transmitted to an audio discriminator circuit 69 as well as to the field modulator circuit 46'. The audio discriminator 69 produces a D.C. output signal having an amplitude proportional to the variation in the frequency $\omega_1$ from a normal value. This variable amplitude D.C. signal is utilized to operate a control circuit in the power supply to thus compensate for drift of the field $H_0$. In place of the discriminator, a phase detector circuit and reference oscillator may be utilized. It is also obvious to those skilled in the art that the error signal output from the audio discriminator could be utilized to control the frequency of the radio frequency oscillator 42' rather than the $H_0$ field strength for the same purpose. This field or frequency control feature may equally well be employed in any of the oscillator systems described.

For example, FIG. 11 discloses a side band oscillator system similar to that shown in FIG. 5, including the R.F. oscillator 81 which supplies the radio frequency driving field to the nuclear sample 82 coupled to the R.F. coil 83, the resonance signals being amplified in the amplifier 84 and transmitted to the detector 85 to produce the audio frequency $\omega_1$. This audio frequency $\omega_1$ is amplified in audio amplifier 86 and transmitted to the polarizing field modulation coil 87 through a compensation condenser 86' for modulating the polarizing field at the low or audio frequency rate $\omega_1$ to produce the sideband resonances. The audio frequency signal $\omega_1$ is also transmitted to a phase detector 88 which receives a reference frequency from the reference audio oscillator 89, the output of the phase detector 88 being a D.C. output signal having an amplitude proportional to the variation in frequency $\omega_1$ from a normal value. This error signal is utilized to regulate the frequency of the R.F. oscillator to compensate for variations in the system parameter and thus automatically control the oscillator.

In FIG. 12 there is shown an amplitude modulated form of side band resonance oscillator similar to that shown in FIG. 8, similar elements bearing similar reference numerals primed. The output from the audio amplifier 64' is transmitted to an audio discriminator 91 which produces a variable amplitude D.C. signal proportional to the variation in frequency $\omega_1$ from the normal value, this D.C. error signal being utilized by means of a compensation coil 92 to change the polarizing magnetic field and at the same time to change the radio frequency of the R.F. oscillator 62' to compensate for any variations in the system parameters to maintain the side band oscillator locked in. Both radio frequency and polarizing magnetic field control may be utilized as shown or, if desired, either one may be employed.

FIG. 13 shows a side band oscillator of the frequency modulation type similar to FIG. 7 and the similar elements therein bear the same reference numerals primed. The output from the audio amplifier 57' is transmitted to a phase detector circuit 93 which receives a reference frequency signal from the reference audio oscillator 94 and produces a D.C. error signal utilized as in FIG. 13 to control the polarizing magnetic field by means of a compensation coil 95 and to control the frequency of the radio frequency oscillator 55', as desired.

Referring to FIG. 10, there is shown a side band oscillator more suitable for higher frequency electron paramagnetic resonance which comprises a microwave bridge such as a magic T 70, one arm of which is coupled to a microwave generator such as a klystron oscillator 71, the opposite arm of the bridge is coupled to the microwave detector 72. Another arm of the bridge is coupled to the cavity resonator 73 in which the paramagnetic resonance substance is positioned and which is located in the polarizing magnetic field $H_0$. The opposite arm 73' has a balanced load therein. The output of the detector is coupled through a radio frequency amplifier 74 and is fed back to the field modulation coil 75 for modulating the field and thus producing the side band resonance. Because of the relatively large gyromagnetic ratio of electrons, as compared with nuclei, the modulating frequency, although relative to the transmitter frequency, is in the radio frequency range, for example, several megacycles. As in the above embodiments, the klystron 71 could be modulated rather than the polarizing field to produce the side bands. The signal output of the amplifier 74 may also be transmitted to a discriminator circuit 75', the output of which may be utilized to control the polarizing magnetic field by magnetic field producing bias coils or by electromagnet power supply control or may be utilized to control the frequency of the klystron.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of producing self-sustaining side band gyromagnetic resonance oscillations which comprises the steps of positioning a gyromagnetic substance in a polarizing magnetic field, applying a driving radio-frequency magnetic field to the substance substantially normal to the direction of the polarizing field, modulating one of said magnetic fields at a periodic low frequency rate to produce gyromagnetic resonance in the substance at a side band radio-frequency differing from the driving radio frequency by an integral multiple of the frequency of the modulating signal, detecting said one side band resonance signal to produce an output signal at the said low frequency rate, and utilizing said low frequency output signal for said magnetic field modulation at the low frequency rate.

2. The method as claimed in claim 1 including the step of controlling one of said magnetic fields in accordance with frequency variations in said low frequency output signal.

3. The method as claimed in claim 2 wherein the step of controlling one of said magnetic fields comprises varying said polarizing magnetic field strength in accordance with the frequency variations in said low frequency output signal.

4. The method as claimed in claim 2 wherein the step of controlling one of said magnetic fields comprises varying the frequency of said driving radio frequency magnetic field in accordance with the frequency variations in said low frequency output signal.

5. The method of producing self-sustaining side band gyromagnetic resonance oscillations which comprises the steps of positioning a gyromagnetic substance in a polarizing magnetic field, applying a driving radio-frequency magnetic field to the substance substantially normal to the direction of the polarizing field, modulating the polarizing magnetic field at a periodic low frequency rate to produce a side band radio-frequency resonance signal from the substance at a side band radio frequency differing from the driving radio frequency by an integral multiple of the frequency of the modulating signal, detecting said one side band resonance signal to produce an output signal at the said low frequency rate, and utilizing said low frequency output signal for said polarizing magnetic field modulation at said low frequency rate.

6. The method as claimed in claim 5 including the step of controlling one of said magnetic fields in accordance with frequency variations in said low frequency output signal.

7. The method as claimed in claim 5 wherein the step of controlling one of said magnetic fields comprises varying said polarizing magnetic field strength in accordance with the frequency variations in said low frequency output signal.

8. The method as claimed in claim 5 wherein the step of controlling one of said magnetic fields comprises varying the frequency of said driving radio frequency magnetic field in accordance with the frequency variations in said low frequency output signal.

9. The method of producing self-sustaining gyromagnetic resonance oscillations which comprises the steps of positioning a gyromagnetic substance in a polarizing magnetic field, applying a driving radio-frequency magnetic field to the substance substantially normal to the direction of the polarizing field, modulating the driving radio frequency magnetic field at a periodic low frequency rate to produce a side band radio-frequency resonance signal from the substance, at a sideband radio frequency differing from the driving radio frequency by an integral multiple of the frequency of the modulating signal, detecting said one side band resonance signal to produce an output signal at the said low frequency rate, and utilizing said low frequencies output signal for said driving radio frequency magnetic field modulation at said low frequency rate.

10. The method as claimed in claim 9 including the step of controlling one of said magnetic fields in accordance with frequency variations in said low frequency output signal.

11. The method as claimed in claim 9 wherein the step of controlling one of said magnetic fields comprises varying said polarizing magnetic field strength in accordance with the frequency variations in said low frequency output signal.

12. The method as claimed in claim 9 wherein the step of controlling one of said magnetic fields comprises varying the frequency of said driving radio frequency magnetic field in accordance with the frequency variations in said low frequency output signal.

13. An oscillator system employing gyromagnetic resonance in a gyromagnetic substance located in a polarizing magnetic field which comprises a radio-frequency source for applying a driving radio-frequency magnetic field to the substance substantially normal to the direction of the polarizing field, means for modulating one of said fields at a periodic low frequency rate to produce gyromagnetic resonance in the substance at a sideband radio frequency differing from the driving radio frequency by an integral multiple of the frequency of the modulating signal, receiver means including means for detecting said one side band resonance signal to produce an output signal at the low frequency rate, and feedback means for supplying said low frequency output signal to said modulating means to sustain the system in oscillation at the sideband resonance.

14. An oscillator system as claimed in claim 13, including means for controlling one of said magnetic fields in accordance with frequency variations in said low frequency output signal.

15. An oscillator system as claimed in claim 14 wherein said last means comprises means for varying the strength of said polarizing magnetic field.

16. An oscillator system as claimed in claim 14 wherein said last means comprises means for varying the frequency of said driving radio-frequency field.

17. An oscillator system employing gyromagnetic resonance in a gyromagnetic substance located in a polarizing magnetic field which comprises a radio-frequency source for applying a driving radio-frequency magnetic field to the substance substantially normal to the direction of the polarizing field, means for modulating said polarizing magnetic field at a periodic low frequency rate to produce gyromagnetic resonance of the substance at a sideband radio-frequency differing from the driving radio frequency by an integral multiple of the frequency of the modulating signal, receiver means including means for detecting said one side band resonance signal to produce an output signal at the said modulating frequency rate, and feedback means for supplying said low frequency output signal to said polarizing magnetic field modulating means to sustain the system in oscillation at the sideband resonance frequency.

18. An oscillator system as claimed in claim 17 including means for controlling one of said magnetic fields in accordance with frequency variations in said lower frequency output signal.

19. An oscillator system as claimed in claim 18 wherein said last means comprises means for varying the strength of said polarizing magnetic field.

20. An oscillator system as claimed in claim 18 wherein said last means comprises means for varying the frequency of said driving radio-frequency field.

21. An oscillator system employing gyromagnetic resonance in a gyromagnetic substance located in a polarizing magnetic field which comprises a radio-frequency source for applying a driving radio-frequency magnetic field to the substance substantially normal to the direction of the polarizing field, means for modulating said radio-frequency magnetic field at a periodic low frequency rate to produce gyromagnetic resonance in the substance at a sideband radio-frequency differing from the driving radio frequency by an integral multiple of the frequency of the modulating signal, receiver means including means for detecting said one side band resonance signal to produce an output signal at the modulating frequency rate, and feedback means for supplying said low frequency output signal to said modulating means to sustain the system in oscillation at the sideband resonance frequency.

22. An oscillator system as claimed in claim 21 including means for controlling one of said magnetic fields in accordance with frequency variations in said low frequency output signal.

23. An oscillator system as claimed in claim 22 wherein said last means comprises means for varying the strength of said polarizing magnetic field.

24. An oscillator system as claimed in claim 22 wherein said last means comprises means for varying the frequency of said driving radio frequency field.

25. An oscillator system employing gyromagnetic resonance in a gyromagnetic substance located in a polarizing magnetic field which comprises means including a radio-frequency transmitter for supplying a driving radio-frequency magnetic field to the substance substantially normal to the direction of the polarizing magnetic field, means coupled to the polarizing field for modulating said polarizing field at a periodic low frequency rate whereby a side band radio-frequency resonance signal is produced from the substance at a sideband radio frequency differing from the driving radio frequency by an integral multiple of the frequency of the modulating signal, receiver means including a radio-frequency mixer for receiving said side band resonance signal and the radio-frequency signal from said radio-frequency transmitter, said radio frequency mixer receiving a reference frequency signal from said transmitter, the output of said radio-frequency mixer including said side band frequencies, a band-pass filter coupled to the output of said radio-frequency mixer for filtering out all but the desired modulating low frequency signal, and a low frequency amplifier coupled to the output of said band-pass filter and coupled to said polarizing field modulating means, the low frequency output of said amplifier being fed back to the low frequency modulating means for maintaining the system in oscillation at the sideband resonance frequency.

26. A gyromagnetic side band resonance oscillator system employing gyromagnetic resonance in a substance located in a polarizing magnetic field which comprises radio-frequency transmitter means including a phase modulator circuit for supplying a radio-frequency driving signal to the substance, means coupled to said phase modulator for modulating the phase of the radio-frequency signal at a periodic low frequency rate to produce a side band radio-frequency resonance signal from the substance at a sideband radio frequency differing from the driving radio frequency by an integral multiple of the frequency of the modulating signal, receiver means including a detector for receiving the resonance signal at said side band frequency and leakage signals at the fundamental and side band frequencies, said detector being sensitive to amplitude changes of the received radio-frequency signals, and a low frequency amplifier means coupled to the output of said detector and coupled to said phase modulator, the output of said low frequency amplifier being fed back to said phase modulator for maintaining said system in oscillation at the sideband resonance frequency.

27. A gyromagnetic side band resonance oscillator system employing gyromagnetic resonance in a substance located in a polarizing magnetic field which comprises radio-frequency transmitter means including an amplitude modulator circuit for supplying a radio-frequency driving signal to the substance, said amplitude modulator modulating the amplitude of the radio-frequency signal at a periodic low frequency rate to produce a side band radio frequency signal at the substance at a sideband frequency differing from the driving radio frequency by an integral multiple of the frequency of the modulating signal, receiver means including a discriminator circuit for receiving the side band resonance signal and leakage signals at the fundamental and side band frequencies and rendering an output signal at the low frequency rate, and a low frequency amplifier coupled to the output of said discriminator and coupled to said amplitude modulator, the output of said low frequency amplifier being fed back to said amplitude modulator for maintaining said system in oscillation at the sideband resonance frequency.

28. The method of producing self-sustaining side band gyromagnetic resonance oscillations which comprises the steps of polarizing a gyromagnetic substance in a magnetic field, applying a driving radio-frequency magnetic field to the substance, modulating said polarization at a periodic low frequency rate to produce a side band radio-frequency resonance signal from the substance at a sideband radio frequency differing from the driving radio frequency by an integral multiple of the frequency of the modulating signal, detecting said one side band resonance signal to produce an output signal at the said low frequency rate, and utilizing said low frequency output signal for said polarization modulation at said low frequency rate.

29. A gyromagnetic resonance oscillator system comprising means for producing a polarizing magnetic field, a gyromagnetic substance located in said polarizing magnetic field, a radio-frequency source for applying a driving radio-frequency magnetic field to the substance substantially normal to the direction of the polarizing magnetic field, means for modulating one of said fields at a periodic low frequency rate to produce gyromagnetic resonance in the substance at a sideband radio frequency differing from the driving radio frequency by an integral multiple of the frequency of the modulating signal, circuit means for mixing said one sideband resonance signal with a frequency of the driving radio frequency value to produce an output signal at the low frequency rate, and feedback means for supplying said low frequency output signal to said modulating means to sustain the system in oscillation at the sideband resonance.

30. An oscillator system as claimed in claim 29 including means for controlling at least one of said magnetic fields in accordance with frequency variations in said low frequency output signal.

31. An oscillator system as claimed in claim 29 wherein said means for modulating one of said magnetic fields comprises means for modulating said polarizing magnetic field.

32. An oscillator system as claimed in claim 29 wherein said means for modulating one of said magnetic fields comprises means for modulating said driving radio frequency field.

References Cited by the Examiner

Anderson: Physical Review, vol. 102, No. 1, April 1, 1956, pp. 151–165 incl.

Burgess et al.: The Review of Scientific Instruments, vol. 23, No. 7, July 1952, pp. 334–336 incl.

Pople et al.: High Resolution Nuclear Magnetic Resonance, McGraw-Hill Book Co., Inc., New York, 1959, pp. 74, 75 and 76 relied on.

CHESTER L. JUSTUS, *Primary Examiner.*

MAYNARD R. WILBUR, *Examiner.*